United States Patent
Sun

(10) Patent No.: US 10,435,326 B2
(45) Date of Patent: Oct. 8, 2019

(54) OPTICAL GLASS, GLASS PREFORM, OPTICAL ELEMENT AND OPTICAL INSTRUMENT

(71) Applicant: CDGM Glass Co., Ltd., Chengdu (CN)

(72) Inventor: Wei Sun, Chengdu (CN)

(73) Assignee: CDGM GLASS CO., LTD., Chengdu (CN)

( * ) Notice: Subject to any disclaimer, the term of this patent is extended or adjusted under 35 U.S.C. 154(b) by 0 days.

(21) Appl. No.: 15/717,887

(22) Filed: Sep. 27, 2017

(65) Prior Publication Data

US 2018/0093916 A1 Apr. 5, 2018

(30) Foreign Application Priority Data

Sep. 30, 2016 (CN) .......................... 2016 1 0868008
Sep. 30, 2016 (CN) .......................... 2016 1 0871806
Jan. 24, 2017 (CN) .......................... 2017 1 0054643

(51) Int. Cl.
*C03C 3/068* (2006.01)

(52) U.S. Cl.
CPC .................................. *C03C 3/068* (2013.01)

(58) Field of Classification Search
CPC ................................. C03C 3/066; C03C 3/068
See application file for complete search history.

(56) References Cited

FOREIGN PATENT DOCUMENTS

| CN | 1389414 | 1/2003 | |
|---|---|---|---|
| CN | 1935717 | 3/2007 | |
| CN | 101844866 | 9/2010 | |
| CN | 101888981 | 11/2010 | |
| CN | 101935164 | 1/2011 | |
| CN | 105948483 | 9/2016 | |
| JP | 2009173520 A * | 8/2009 | |
| JP | 2009537427 A * | 10/2009 | ............. C03C 3/068 |

* cited by examiner

*Primary Examiner* — Elizabeth A. Bolden
(74) *Attorney, Agent, or Firm* — Leason Ellis LLP

(57) ABSTRACT

The present invention discloses an optical glass, and more particularly, relates to an optical glass for precision press molding which has a refractive index of 1.80 to 1.90 and an Abbe number of 30 to 40, as well as a glass preform, an optical element and an optical instrument formed from the optical glass. The optical glass of the present invention combines specific components and specific contents, thereby giving an optical glass for precision press molding.

13 Claims, No Drawings

OPTICAL GLASS, GLASS PREFORM, OPTICAL ELEMENT AND OPTICAL INSTRUMENT

CROSS-REFERENCE TO RELATED PATENT APPLICATIONS

This application claims priority to Chinese Application Nos.: 201610868008.9, filed Sep. 30, 2016, 201610871806.7, filed Sep. 30, 2016, and 201710054643.8, filed Jan. 24, 2017, each of which is incorporated by reference as if expressly set forth in their respective entirety herein.

FIELD OF TECHNOLOGY

The present invention discloses an optical glass, and more particularly, relates to an optical glass for precision press molding which has a refractive index (nd) of 1.80 to 1.90 and an Abbe number (vd) of 30 to 40, as well as a glass preform, an optical element and an optical instrument formed from the optical glass.

BACKGROUND

The most basic optical property parameters of an optical glass are refractive index and dispersion. Refraction is generated due to the change in the propagation direction of light in a medium relative to in air (or vacuum), and dispersion is generated due to a decrease of refractive index of a same medium with decreasing of the frequency of an incident light. In an optical glass, Abbe number is associated with dispersion, and the higher the dispersion, the lower the Abbe number. Therefore, a high refractive index of an optical glass indicates that the propagation direction of light is changed greatly by the optical glass. High dispersion of an optical glass indicates that the optical glass has a strong dispersion effect on light and a good spectral separation effect; and low dispersion of an optical glass indicates that the optical glass has a weak dispersion effect on light and a good imaging effect. When a spectroscopic study on light is required, it is desirable to obtain a lens with high dispersion so as to separate lights with different wavelengths more clearly. In modern photo-optical systems, it is always desirable to obtain a lens having low dispersion and a good imaging effect. Therefore, no matter in what kind of invention area, one optical glass is generally difficult to meet specific requirements, and usually a number of optical glasses with different dispersions are used. In the cases where dispersion correction can be performed, optical glasses with relatively high refractive indexes are often used, making an optical glass with high refractive index more and more important in the field of optical glass. In particular, an optical glass having a refractive index of 1.80 or more and dispersion in a middle range (that is, Abbe number being in the range of 30 to 40) are usually used.

In recent years, with the development of the optoelectronic industry, optical equipments are demanded to meet the requirements of miniaturization, light weight and high performance. In order to reduce the number of lenses constituting the optical system in an optical equipment, aspheric lenses are increasingly used in optical designs. Precision press molding is presently wildly used for manufacturing aspheric lenses. The so-called precision press molding means that a glass preform is molded using a high-precision mold with a predetermined product shape under certain temperature and pressure conditions to obtain glass products having the product shape and an optical functional surface. For aspheric lenses manufactured by using the precision press molding, it is not needed to preform further grinding and polishing, and thus the cost is reduced and the production efficiency is increased.

When the precision press molding is performed, in order to transfer a high-precision mold surface to a glass molded article, it is necessary to conduct pressure-molding on a glass preform at a high temperature. At this time, the pressing mold is exposed to a high temperature environment and subjected to a high pressure, and even if the pressing mold is in a protective atmosphere, the molding surface of the pressing mold is still easy to be oxidized and eroded. In precision press molding methods, high-precision molds are the main source of cost, and when a mold cannot be used a certain number of times, low cost and high yield will not be achieved. In order to extend the service life of the mold and reduce damages to the mold caused by the high temperature environment, it is necessary to reduce the temperature of the press molding as much as possible. Therefore, the transition temperature Tg of the glass material used is required to be as low as possible.

SUMMARY

In view of the above, the present invention provides an optical glass suitable for precision press molding which has a refractive index nd of 1.80 to 1.90, an Abbe number vd of 30 to 40, and a transition temperature Tg of 630° C. or less.

In order to solve the above mentioned technical problems, the technical solution provided by the invention is an optical glass comprising the following components (content of each component is shown by weight percentage):

$B_2O_3$: 5% to 30%;
ZnO: 20% to 50%;
$SiO_2$: more than 0% but less than or equal to 15%;
$ZrO_2$: more than 0% but less than or equal to 15%;
$Ln_2O_3$: 20% to 50%;
R1: 1% to 30%; and
R2: 0.1% to 10%;
  wherein, $Ln_2O_3$ is at least one or any one selected from the group consisting of $La_2O_3$, $Gd_2O_3$, $Y_2O_3$ and $Yb_2O_3$;
  R1 is at least one selected from a group consisting of $TiO_2$, $WO_3$ and $Nb_2O_5$; and
  R2 is at least one selected from a group consisting of $Li_2O$, $Na_2O$ and $K_2O$.

Preferably, the contents of respective components are shown as follows (content of each component is shown by weight percentage):

$B_2O_3$: 8% to 25%; and/or
ZnO: 25% to 50%; and/or
$SiO_2$: 1% to 10%; and/or
$ZrO_2$: 1% to 10%; and/or
$Ln_2O_3$: 25% to 50%; and/or
R1: 3% to 30%; and/or
R2: 0.1% to 10%.

Preferably, wherein, R1 is $TiO_2$ and $Nb_2O_5$, and the weight percentage ratio of $TiO_2$ to the weight percentage of $TiO_2+Nb_2O_5$, i.e., $TiO_2/(TiO_2+Nb_2O_5)$, is more than 0 but less than or equal to 0.9.

Preferably, wherein, the weight percentage ratio of R1 to $ZrO_2$, i.e., $R1/ZrO_2$, is 0.5 to 10.

Preferably, wherein, the sum of the weight percentages of $SiO_2$ and $B_2O_3$, i.e., $SiO_2+B_2O_3$, is 10% to 35%.

Preferably, wherein, the optical glass further comprises (contents are shown by weight percentage):

$Ta_2O_5$: 0% to 8%;
$TeO_2$: 0% to 10%;
$Ga_2O_3$: 0% to 10%;
$Lu_2O_3$: 0% to 10%; and
$GeO_2$: 0% to 8%.

Preferably, wherein, the optical glass further comprises a fining agent of 0 to 1%, and the fining agent is one or more selected from a group consisting of $Sb_2O_3$, SnO, $SnO_2$, $CeO_2$, a $Cl^-$-containing compound, a $Br^-$-containing compound and an $I^-$-containing compound.

Preferably, wherein, the optical glass has a refractive index nd of 1.80 to 1.90, an Abbe number vd of 30 to 40, and a transition temperature Tg of 630° C. or less.

Preferably, wherein, the upper crystallization temperature of the optical glass is 1150° C. or less.

Furthermore, the present invention provides a glass preform made of any one of the above optical glasses.

Furthermore, the present invention provides a glass-optical element made of any one of the above optical glasses.

Furthermore, the present invention provides a glass-optical instrument formed of any one of the above optical glasses.

In the optical glass provided by the present invention, the components thereof comprise the oxides as listed above, however, other components may present as impurities.

It is to be noted that, in the technical solution of the present invention, the percentage content of each component is expressed by weight percentage, unless otherwise indicated.

It is to be noted that, in the technical solution of the present invention, the composition of the optical glass refers to the composition of the final finished optical glass product, and oxide components and the contents thereof can be obtained by subjecting the optical glass product to element analysis. Therefore, the contents of the components described in the present invention do not refer to the contents in raw materials for manufacturing the optical glass. According to conventional calculation methods, the contents in raw materials may be obtained through conventional calculation based on corresponding oxide components in the optical glass obtained according to the technical solution of the present invention.

DESCRIPTION OF THE EMBODIMENTS

In order to make those skilled in the art have a better understanding of the technical solution of the present invention, the present invention will be further described in detail with reference to specific embodiments.

Hereafter the details of the technical solution of the present invention will be described in detail.

$B_2O_3$: $B_2O_3$ is a main component for forming glass network formers. In particular, for lanthanide optical glasses with a high refractive index and low dispersion, $B_2O_3$ is a main component for obtaining a stable glass. For the solution of the present invention, when the content of $B_2O_3$ is higher than 30%, the refractive index of the glass cannot achieve a designed level, and meanwhile the chemical stability of the glass is lowered. Therefore, the content of $B_2O_3$ is limited to a range from 5% to 30%; more preferably, the content of $B_2O_3$ is 8% to 25%; and particularly preferably, the content of $B_2O_3$ is 10% to 20%.

ZnO: ZnO is an important component for forming low melting point optical glasses, which can reduce the thermal expansion coefficient of a glass and improve the chemical stability, the thermal stability and the refractive index of the glass. For the solution of the present invention, when the content of ZnO is less than 20%, the transition temperature of the glass increases; and when the content of ZnO is higher than 50%, the crystallization tendency increases and the high-temperature viscosity of the glass becomes smaller, leading to a great difficulty in the molding of the glass. Therefore, the content of ZnO is limited to a range from 20% to 50%; and more preferably, the content of ZnO is 25% to 50%.

R2: R2 is at least one selected from the group consisting of $Li_2O$, $Na_2O$, and $K_2O$. R2 can effectively reduce the glass transition temperature and the melting temperature in glass production. For the solution of the present invention, when the content of R2 exceeds 10%, the devitrification resistance of the glass is deteriorated, and it is difficult to obtain the optical constant having a targeted level. Therefore, the content of R2 is limited to a range from 0.1% to 10%; and more preferably R2 is $Li_2O$.

$SiO_2$: $SiO_2$ is a main component for forming glass network formers. $SiO_2$ plays the role of maintaining the devitrification resistance of glass. For the solution of the present invention, when the content of $SiO_2$ is higher than 15%, the fusibility of the optical glass is lowered. Therefore, the content of $SiO_2$ is limited to be more than 0% but less than or equal to 15%; and more preferably, the content of $SiO_2$ is 1% to 10%. Additionally, in the present invention, the content of $SiO_2$ and $B_2O_3$, i.e., $SiO_2+B_2O_3$, is particularly preferably from 10% to 35%, and more preferably, the content of $SiO_2+B_2O_3$ is 15% to 30%.

$ZrO_2$: $ZrO_2$ is capable of improving viscosity, hardness, elasticity, refractive index and chemical stability of a optical glass, and can reduce the thermal expansion coefficient of the glass. For the solution of the present invention, when the content of $ZrO_2$ is higher than 15%, the devitrification of the optical glass is increased. Therefore, the content of $ZrO_2$ is limited to be more than 0% but less than or equal to 15%; and more preferably, the content of $ZrO_2$ is 1% to 10%.

$Ln_2O_3$: $Ln_2O_3$ is at least one selected from the group consisting of $La_2O_3$, $Gd_2O_3$, $Y_2O_3$ and $Yb_2O_3$. $Ln_2O_3$ is a main component of a optical glass with high refractive index, which can increase the refractive index of a glass while does not significantly increase the dispersion of the glass. With combination of $B_2O_3$ and $Ln_2O_3$, the devitrification resistance and the chemical stability of the glass may be effectively improved. In the present invention, $Ln_2O_3$ is preferably $La_2O_3$.

In the present invention, the devitrification resistance of the glass may be improved by adding a certain amount of $Ln_2O_3$. In the present invention, the content of $Ln_2O_3$ is preferably controlled to be 20 to 50%, which can remarkably improve the chemical stability and adjust the optical properties of the glass. When the content of $Ln_2O_3$ exceeds 25%, the refractive index will exceed a predetermined value. Therefore, the content of $Ln_2O_3$ is 20% to 50%, preferably 25% to 50%, and more preferably 28% to 50%.

R1: R1 is at least one selected from the group consisting of $TiO_2$, $WO_3$ and $Nb_2O_5$. R1 can make a glass have a high refractive index, effectively reduce cost, and reduce the glass density. However, excessive use of R1 will greatly reduce transmittance of the glass in the near ultraviolet area and the short-wave area of visible light.

In the present invention, the glass optical constant may be effectively adjusted by adding a certain amount of R1. In the present invention, the content of R1 is preferably controlled to be 1 to 30%, more preferably the content of R1 is 1 to 30%, and particularly preferably 3 to 25%. In the present invention, R1 is preferably $TiO_2$ and $Nb_2O_5$, and the weight percentages thereof are as follows: $TiO_2$: more than 0% but less than or equal to 10%; and $Nb_2O_5$: 1 to 20%. Particularly preferably, R1 is $TiO_2$ and $Nb_2O_5$, and the weight percentages thereof are as follows: $TiO_2$: 1 to 7%; and $Nb_2O_5$: 1 to 15%. In addition, it is particularly preferable in the present invention that R1 is $TiO_2$ and $Nb_2O_5$, and the weight percentage ratio of $TiO_2$ to $TiO_2+Nb_2O_5$, i.e., $TiO_2/(TiO_2+Nb_2O_5)$, is more than 0 but less than or equal to 0.9; further preferably, the weight percentage ratio of $TiO_2$ to $TiO_2+Nb_2O_5$, i.e., $TiO_2/(TiO_2+Nb_2O_5)$, is more than 0 but less than or equal to 0.8.

In the present invention, it is particularly preferable that the weight percentage ratio of R1 to $ZrO_2$, i.e., $R1/ZrO_2$, is 0.5 to 10; and more preferably, the weight percentage ratio of R1 to $ZrO_2$, i.e., $R1/ZrO_2$, is 0.5 to 6.

In the present invention, it is preferable that other components may be added into the optical glass, wherein the optical glass further comprises (contents are shown by weight percentage):

$Li_2O$: 0 to 10%; and/or
$Na_2O$: 0 to 10%; and/or
$K_2O$: 0 to 10%; and/or
$Al_2O_3$: 0 to 10%; and/or
$WO_3$: 0 to 10%; and/or
$Gd_2O_3$: 0 to 10%; and/or
$Y_2O_3$: 0 to 10%; and/or
$Yb_2O_3$: 0 to 10%; and/or
MgO: 0 to 10%; and/or
CaO: 0 to 10%; and/or
SrO: 0 to 10%; and/or
BaO: 0 to 10%.

It is more particularly preferable that the contents of a part of the components may be as follows (contents are shown by weight percentage):

$Li_2O$: 0 to 5%; and/or
$Na_2O$: 0 to 5%; and/or
$K_2O$: 0 to 5%; and/or
$Al_2O_3$: 0 to 5%; and/or
$WO_3$: 0 to 5%; and/or
$Gd_2O_3$: 0 to 5%; and/or
$Y_2O_3$: 0 to 5%; and/or
$Yb_2O_3$: 0 to 5%; and/or
MgO: 0 to 5%; and/or
CaO: 0 to 5%; and/or
SrO: 0 to 5%; and/or
BaO: 0 to 5%.

In the present invention, it is preferable to add other auxiliary components into the optical glass. Wherein the optical glass may further comprises (contents are shown by weight percentage):

$Ta_2O_5$: 0 to 8%;
$TeO_2$: 0 to 10%;
$Ga_2O_3$: 0% to 10%;
$Lu_2O_3$: 0% to 10%; and
$GeO_2$: 0% to 8%.

In the present invention, it is preferable to add other auxiliary components into the optical glass, and the optical glass may further comprise a fining agent of 0 to 1% which is one or more selected from the group consisting of $Sb_2O_3$, SnO, $SnO_2$, $CeO_2$, a Cl$^-$-containing compound, a Br$^-$-containing compound and an I$^-$-containing compound.

In the present invention, the clarification effect of the glass may be improved by adding a small amount of one or more of $Sb_2O_3$, SnO, $SnO_2$, and $CeO_2$. However, when the content of $Sb_2O_3$ exceeds 1%, the glass tends to have a reduced clarity. The corrosion of the platinum or platinum alloy vessels used in glass melting process and the deterioration of the pressing mold are accelerated by $Sb_2O_3$ due to its strong oxidizing effect. Therefore, it is preferable in the present invention that $Sb_2O_3$ is added in an amount of 0 to 1%, more preferably in an amount of 0 to 0.5%, and further preferably $Sb_2O_3$ is not added. Also, SnO and $SnO_2$ may be added as fining agents. However, when the content thereof exceeds 1%, the glass may be colored, or SnO and $SnO_2$ may become a starting point for the generation of crystal nucleus and lead to the tendency of devitrification when the glass is remolded through heating, softening, and press molding. Therefore, respectively, the content of each of SnO and $SnO_2$ in the present invention is preferably 0 to 1%, more preferably 0 to 0.5%, and further preferably, SnO or $SnO_2$ is not added. The function and the amount of $CeO_2$ are the same as that of SnO and $SnO_2$. The content of $CeO_2$ is preferably from 0 to 1%, more preferably 0 to 0.5%, and further preferably, $CeO_2$ is not added. Additionally, in the present invention, one or more of a Cl$^-$-containing compound, a Br$^-$-containing compound and an I$^-$-containing compound may be further added into the optical glass, which can facilitate removal of bubbles during the melting process of the optical glass. Desired clarification effect may be achieved by introducing any compound selected from the group consisting of a Cl$^-$-containing compound, a Br$^-$-containing compound and an I$^-$-containing compound of 0 to 1%.

Hereafter, specific performance parameters of different optical glasses according to the technical solution of the present invention will be described in detail.

Refractive index nd and Abbe number vd: The resulting optical glasses were tested in accordance with "GB/T7962.1-1987, Test Methods of Colorless Optical Glasses, Refractive Index and Dispersion Coefficient".

Transition temperature Tg: The transition temperature is measured according to "GB/T7962.16-1987, Test Methods of Colorless Optical Glasses, Linear Expansion Coefficient, Transition Temperature and Relax Hanging Temperature". That is, in the expansion curve of a sample which is tested in a temperature range (for example, from room temperature to softening temperature of the sample) with the temperature increased 1° C. each time, the temperature corresponding to the cross point which is obtained by extending the straight-line part in the low-temperature region and the straight-line part in the high-temperature region is the transition temperature.

Upper crystallization temperature: The crystallization property of the glass is measured by the gradient-temperature furnace method. The glass is made into samples in size of 180 mm×10 mm×10 mm with the side surface being polished. A sample glass is placed in a furnace with a temperature gradient for 4 hours and then taken out. The crystallization situation is observed under a microscope. The highest temperature at which crystals occurred in the glass is the upper crystallization temperature. The lower the crystallization temperature of the glass, the higher the stability of the glass at high temperature, and the better the process performance.

Transmittance and chromaticity: The short-wave transmission spectrum property of the glass in the present invention was represented by chromaticity (λ80/25). λ80 is the wavelength at which the glass transmittance reaches 80%, and λ5 is the wavelength at which the glass transmittance reaches 5%. Wherein, λ80 is determined by using a glass having a thickness of 1±00.1 mm and having two opposite planes which are parallel to each other and optically polished, and measuring the spectral transmittances in the wavelength region from 280 nm to 700 nm and a wavelength exhibiting 80% transmittance. The spectral transmittance or transmittance refers to a value indicated by Iout/Iin in the case where an incident light with an intensity of Iin, which was perpendicularly to one of the above surfaces of the glass, passes through the glass and a light with an intensity of bout is emitted from the other plane, and the spectral transmittance or transmittance also comprises the surface reflection loss on the incident surface of the glass. The higher the refractive index of the glass, the greater the surface reflection loss. Therefore, in the high refractive index glass, a small value of λ80 means that the glass itself is colored to the least extent.

After tested the optical glass provided by the present invention has the following property parameters: the refractive index nd is 1.80 to 1.90, the Abbe number vd is 30 to 40, the transition temperature Tg is 630° C. or less, the upper crystallization temperature is 1150° C. or less, λ80 is less than or equal to 420 nm, and λ5 is less than or equal to 360 nm.

Examples of the optical glass obtained according to the technical solution of the present invention will be described hereafter. It should be noted that these examples do not limit the scope of the present invention.

The examples listed in the table below are optical glasses obtained according to the technical solution and the preferable technical solution of the present invention. The optical glass in each of the examples was prepared according to a existing method for preparing a optical glass including the following method or other conventional methods for preparing a optical glass in the field: raw materials were weighted according to the proportions of different components in the examples below, placed into a platinum crucible and melted at a temperature of 1100 to 1300° C.; after melting, clarification and homogenization, homogeneous molten glass having no bubbles and no unmelted material is obtained; and the molten glass is molded in a mold and annealed so as to give the optical glass.

The contents of the oxide components in the optical glass of each of the following examples was confirmed by conventional elemental analysis, and the content of each oxide was a weight percentage content based on the total weight of the optical glass, wherein the impurity components were excluded.

TABLE 1

| Example | Component Content (%) | | | | | | |
|---|---|---|---|---|---|---|---|
| | $B_2O_3$ | ZnO | $Na_2O$ | $SiO_2$ | $ZrO_2$ | $Y_2O_3$ | $WO_3$ |
| 1-1 | 5 | 20 | 10 | 0.1 | 14.9 | 20 | 30 |
| 1-2 | 5 | 50 | 7.9 | 0.1 | 15 | 20 | 2 |
| 1-3 | 30 | 20 | 1 | 15 | 12 | 21 | 1 |
| 1-4 | 5 | 50 | 10 | 12.4 | 0.1 | 20 | 2.5 |
| 1-5 | 5 | 20 | 7.5 | 11 | 10.5 | 20 | 26 |
| 1-6 | 7.9 | 20.6 | 0.1 | 11.5 | 0.9 | 50 | 9 |
| 1-7 | 26.8 | 50 | 1 | 0.6 | 0.6 | 20 | 1 |
| 1-8 | 26.8 | 20 | 1 | 0.6 | 0.6 | 50 | 1 |
| 1-9 | 8 | 25 | 10 | 3 | 1 | 50 | 3 |
| 1-10 | 8 | 25 | 6 | 1 | 5 | 25 | 30 |
| 1-11 | 8 | 50 | 10 | 3 | 1 | 25 | 3 |
| 1-12 | 25 | 25 | 10 | 6 | 6 | 25 | 3 |
| 1-13 | 8 | 50 | 1 | 10 | 3 | 25 | 3 |
| 1-14 | 21 | 25 | 6 | 10 | 10 | 25 | 3 |
| 1-15 | 10 | 50 | 5 | 1 | 1 | 30 | 3 |
| 1-16 | 10 | 25 | 10 | 1 | 1 | 50 | 3 |
| 1-17 | 20 | 25 | 6 | 1 | 1 | 28 | 19 |
| 1-18 | 10 | 25 | 1 | 10 | 1 | 28 | 25 |
| 1-19 | 20 | 25 | 10 | 10 | 2 | 30 | 3 |
| 1-20 | 20 | 25 | 10 | 5.4 | 5.6 | 30 | 3 |
| 1-21 | 20 | 25 | 8 | 10 | 6 | 28 | 3 |
| 1-22 | 20 | 25 | 6 | 8 | 10 | 28 | 3 |

TABLE 2

| Example | Component Content (%) | | | | | | |
|---|---|---|---|---|---|---|---|
| | $B_2O_3$ | ZnO | $K_2O$ | $SiO_2$ | $ZrO_2$ | $Gd_2O_3$ | $WO_3$ |
| 2-1 | 5 | 20 | 10 | 0.1 | 14.9 | 20 | 30 |
| 2-2 | 5 | 50 | 7.9 | 0.1 | 15 | 20 | 2 |
| 2-3 | 30 | 20 | 1 | 15 | 12 | 21 | 1 |
| 2-4 | 5 | 50 | 10 | 12.4 | 0.1 | 20 | 2.5 |
| 2-5 | 5 | 20 | 7.5 | 11 | 10.5 | 20 | 26 |
| 2-6 | 7.9 | 20.6 | 0.1 | 11.5 | 0.9 | 50 | 9 |
| 2-7 | 26.8 | 50 | 1 | 0.6 | 0.6 | 20 | 1 |
| 2-8 | 26.8 | 20 | 1 | 0.6 | 0.6 | 50 | 1 |
| 2-9 | 8 | 25 | 10 | 3 | 1 | 50 | 3 |
| 2-10 | 8 | 25 | 6 | 1 | 5 | 25 | 30 |
| 2-11 | 8 | 50 | 10 | 3 | 1 | 25 | 3 |
| 2-12 | 25 | 25 | 10 | 6 | 6 | 25 | 3 |
| 2-13 | 8 | 50 | 1 | 10 | 3 | 25 | 3 |
| 2-14 | 21 | 25 | 6 | 10 | 10 | 25 | 3 |
| 2-15 | 10 | 50 | 5 | 1 | 1 | 30 | 3 |
| 2-16 | 10 | 25 | 10 | 1 | 1 | 50 | 3 |
| 2-17 | 20 | 25 | 6 | 1 | 1 | 28 | 19 |
| 2-18 | 10 | 25 | 1 | 10 | 1 | 28 | 25 |
| 2-19 | 20 | 25 | 10 | 10 | 2 | 30 | 3 |
| 2-20 | 20 | 25 | 10 | 5.4 | 5.6 | 30 | 3 |
| 2-21 | 20 | 25 | 8 | 10 | 6 | 28 | 3 |
| 2-22 | 20 | 25 | 6 | 8 | 10 | 28 | 3 |

TABLE 3

| Example | Component Content (%) | | | | | | |
|---|---|---|---|---|---|---|---|
| | $B_2O_3$ | ZnO | $Na_2O$ | $SiO_2$ | $ZrO_2$ | $Yb_2O_3$ | $WO_3$ |
| 3-1 | 5 | 20 | 10 | 0.1 | 14.9 | 20 | 30 |
| 3-2 | 5 | 50 | 7.9 | 0.1 | 15 | 20 | 2 |
| 3-3 | 30 | 20 | 1 | 15 | 12 | 21 | 1 |
| 3-4 | 5 | 50 | 10 | 12.4 | 0.1 | 20 | 2.5 |
| 3-5 | 5 | 20 | 7.5 | 11 | 10.5 | 20 | 26 |
| 3-6 | 7.9 | 20.6 | 0.1 | 11.5 | 0.9 | 50 | 9 |
| 3-7 | 26.8 | 50 | 1 | 0.6 | 0.6 | 20 | 1 |
| 3-8 | 26.8 | 20 | 1 | 0.6 | 0.6 | 50 | 1 |
| 3-9 | 8 | 25 | 10 | 3 | 1 | 50 | 3 |
| 3-10 | 8 | 25 | 6 | 1 | 5 | 25 | 30 |
| 3-11 | 8 | 50 | 10 | 3 | 1 | 25 | 3 |
| 3-12 | 25 | 25 | 10 | 6 | 6 | 25 | 3 |
| 3-13 | 8 | 50 | 1 | 10 | 3 | 25 | 3 |
| 3-14 | 21 | 25 | 6 | 10 | 10 | 25 | 3 |
| 3-15 | 10 | 50 | 5 | 1 | 1 | 30 | 3 |
| 3-16 | 10 | 25 | 10 | 1 | 1 | 50 | 3 |
| 3-17 | 20 | 25 | 6 | 1 | 1 | 28 | 19 |
| 3-18 | 10 | 25 | 1 | 10 | 1 | 28 | 25 |
| 3-19 | 20 | 25 | 10 | 10 | 2 | 30 | 3 |
| 3-20 | 20 | 25 | 10 | 5.4 | 5.6 | 30 | 3 |
| 3-21 | 20 | 25 | 8 | 10 | 6 | 28 | 3 |
| 3-22 | 20 | 25 | 6 | 8 | 10 | 28 | 3 |

TABLE 4

| Example | Component Content (%) | | | | | | | |
|---|---|---|---|---|---|---|---|---|
| | $B_2O_3$ | ZnO | $Na_2O$ | $SiO_2$ | $ZrO_2$ | $Gd_2O_3$ | $TiO_2$ | $Nb_2O_5$ |
| 4-1 | 5 | 20 | 10 | 0.1 | 14.9 | 20 | 10 | 20 |
| 4-2 | 5 | 50 | 7.9 | 0.1 | 15 | 20 | 1 | 1 |

TABLE 4-continued

| Example | Component Content (%) | | | | | | | |
|---|---|---|---|---|---|---|---|---|
| | B₂O₃ | ZnO | Na₂O | SiO₂ | ZrO₂ | Gd₂O₃ | TiO₂ | Nb₂O₅ |
| 4-3 | 30 | 20 | 1 | 15 | 12 | 21 | 0 | 1 |
| 4-4 | 5 | 50 | 10 | 12.4 | 0.1 | 20 | 2 | 0.5 |
| 4-5 | 5 | 20 | 7.5 | 11 | 10.5 | 20 | 23.4 | 2.6 |
| 4-6 | 7.9 | 20.6 | 0.1 | 11.5 | 0.9 | 50 | 7 | 2 |
| 4-7 | 26.8 | 50 | 1 | 0.6 | 0.6 | 20 | 0 | 1 |
| 4-8 | 26.8 | 20 | 1 | 0.6 | 0.6 | 50 | 0 | 1 |
| 4-9 | 8 | 25 | 10 | 3 | 1 | 50 | 2 | 1 |
| 4-10 | 8 | 25 | 6 | 1 | 5 | 25 | 27 | 3 |
| 4-11 | 8 | 50 | 10 | 3 | 1 | 25 | 1.5 | 1.5 |
| 4-12 | 25 | 25 | 10 | 6 | 6 | 25 | 1.5 | 1.5 |
| 4-13 | 8 | 50 | 1 | 10 | 3 | 25 | 1.6 | 1.4 |
| 4-14 | 21 | 25 | 6 | 10 | 10 | 25 | 2 | 1 |
| 4-15 | 10 | 50 | 5 | 1 | 1 | 30 | 2 | 1 |
| 4-16 | 10 | 25 | 10 | 1 | 1 | 50 | 2.4 | 0.6 |
| 4-17 | 20 | 25 | 6 | 1 | 1 | 28 | 4 | 15 |
| 4-18 | 10 | 25 | 1 | 10 | 1 | 28 | 5 | 20 |
| 4-19 | 20 | 25 | 10 | 10 | 2 | 30 | 1 | 2 |
| 4-20 | 20 | 25 | 10 | 5.4 | 5.6 | 30 | 2.7 | 0.3 |
| 4-21 | 20 | 25 | 8 | 10 | 6 | 28 | 1.6 | 1.4 |
| 4-22 | 20 | 25 | 6 | 8 | 10 | 28 | 2 | 1 |

TABLE 5

| Example | Component Content (%) | | | | | | | |
|---|---|---|---|---|---|---|---|---|
| | B₂O₃ | ZnO | K₂O | SiO₂ | ZrO₂ | Yb₂O₃ | TiO₂ | Nb₂O₅ |
| 5-1 | 5 | 20 | 10 | 0.1 | 14.9 | 20 | 10 | 20 |
| 5-2 | 5 | 50 | 7.9 | 0.1 | 15 | 20 | 1 | 1 |
| 5-3 | 30 | 20 | 1 | 15 | 12 | 21 | 0 | 1 |
| 5-4 | 5 | 50 | 10 | 12.4 | 0.1 | 20 | 2 | 0.5 |
| 5-5 | 5 | 20 | 7.5 | 11 | 10.5 | 20 | 23.4 | 2.6 |
| 5-6 | 7.9 | 20.6 | 0.1 | 11.5 | 0.9 | 50 | 7 | 2 |
| 5-7 | 26.8 | 50 | 1 | 0.6 | 0.6 | 20 | 0 | 1 |
| 5-8 | 26.8 | 20 | 1 | 0.6 | 0.6 | 50 | 0 | 1 |
| 5-9 | 8 | 25 | 10 | 3 | 1 | 50 | 2 | 1 |
| 5-10 | 8 | 25 | 6 | 1 | 5 | 25 | 27 | 3 |
| 5-11 | 8 | 50 | 10 | 3 | 1 | 25 | 1.5 | 1.5 |
| 5-12 | 25 | 25 | 10 | 6 | 6 | 25 | 1.5 | 1.5 |
| 5-13 | 8 | 50 | 1 | 10 | 3 | 25 | 1.6 | 1.4 |
| 5-14 | 21 | 25 | 6 | 10 | 10 | 25 | 2 | 1 |
| 5-15 | 10 | 50 | 5 | 1 | 1 | 30 | 2 | 1 |
| 5-16 | 10 | 25 | 10 | 1 | 1 | 50 | 2.4 | 0.6 |
| 5-17 | 20 | 25 | 6 | 1 | 1 | 28 | 4 | 15 |
| 5-18 | 10 | 25 | 1 | 10 | 1 | 28 | 5 | 20 |
| 5-19 | 20 | 25 | 10 | 10 | 2 | 30 | 1 | 2 |
| 5-20 | 20 | 25 | 10 | 5.4 | 5.6 | 30 | 2.7 | 0.3 |
| 5-21 | 20 | 25 | 8 | 10 | 6 | 28 | 1.6 | 1.4 |
| 5-22 | 20 | 25 | 6 | 8 | 10 | 28 | 2 | 1 |

TABLE 6

| Example | Component Content (%) | | | | | | | |
|---|---|---|---|---|---|---|---|---|
| | B₂O₃ | ZnO | Li₂O | SiO₂ | ZrO₂ | Y₂O₃ | TiO₂ | Nb₂O₅ |
| 6-1 | 5 | 20 | 10 | 0.1 | 14.9 | 20 | 10 | 20 |
| 6-2 | 5 | 50 | 7.9 | 0.1 | 15 | 20 | 1 | 1 |
| 6-3 | 30 | 20 | 1 | 15 | 12 | 21 | 0 | 1 |
| 6-4 | 5 | 50 | 10 | 12.4 | 0.1 | 20 | 2 | 0.5 |
| 6-5 | 5 | 20 | 7.5 | 11 | 10.5 | 20 | 23.4 | 2.6 |
| 6-6 | 7.9 | 20.6 | 0.1 | 11.5 | 0.9 | 50 | 7 | 2 |
| 6-7 | 26.8 | 50 | 1 | 0.6 | 0.6 | 20 | 0 | 1 |
| 6-8 | 26.8 | 20 | 1 | 0.6 | 0.6 | 50 | 0 | 1 |
| 6-9 | 8 | 25 | 10 | 3 | 1 | 50 | 2 | 1 |
| 6-10 | 8 | 25 | 6 | 1 | 5 | 25 | 27 | 3 |
| 6-11 | 8 | 50 | 10 | 3 | 1 | 25 | 1.5 | 1.5 |
| 6-12 | 25 | 25 | 10 | 6 | 6 | 25 | 1.5 | 1.5 |
| 6-13 | 8 | 50 | 1 | 10 | 3 | 25 | 1.6 | 1.4 |
| 6-14 | 21 | 25 | 6 | 10 | 10 | 25 | 2 | 1 |
| 6-15 | 10 | 50 | 5 | 1 | 1 | 30 | 2 | 1 |
| 6-16 | 10 | 25 | 10 | 1 | 1 | 50 | 2.4 | 0.6 |
| 6-17 | 20 | 25 | 6 | 1 | 1 | 28 | 4 | 15 |
| 6-18 | 10 | 25 | 1 | 10 | 1 | 28 | 5 | 20 |
| 6-19 | 20 | 25 | 10 | 10 | 2 | 30 | 1 | 2 |
| 6-20 | 20 | 25 | 10 | 5.4 | 5.6 | 30 | 2.7 | 0.3 |
| 6-21 | 20 | 25 | 8 | 10 | 6 | 28 | 1.6 | 1.4 |
| 6-22 | 20 | 25 | 6 | 8 | 10 | 28 | 2 | 1 |

TABLE 7

| Example | Component Content (%) | | | | | | | |
|---|---|---|---|---|---|---|---|---|
| | B₂O₃ | ZnO | Li₂O | SiO₂ | ZrO₂ | La₂O₃ | TiO₂ | Nb₂O₅ |
| 7-1 | 5 | 20 | 10 | 0.1 | 14.9 | 20 | 10 | 20 |
| 7-2 | 5 | 50 | 7.9 | 0.1 | 15 | 20 | 1 | 1 |
| 7-3 | 30 | 20 | 1 | 15 | 12 | 21 | 0 | 1 |
| 7-4 | 5 | 50 | 10 | 12.4 | 0.1 | 20 | 2 | 0.5 |
| 7-5 | 5 | 20 | 7.5 | 11 | 10.5 | 20 | 23.4 | 2.6 |
| 7-6 | 7.9 | 20.6 | 0.1 | 11.5 | 0.9 | 50 | 7 | 2 |
| 7-7 | 26.8 | 50 | 1 | 0.6 | 0.6 | 20 | 0 | 1 |
| 7-8 | 26.8 | 20 | 1 | 0.6 | 0.6 | 50 | 0 | 1 |
| 7-9 | 8 | 25 | 10 | 3 | 1 | 50 | 2 | 1 |
| 7-10 | 8 | 25 | 6 | 1 | 5 | 25 | 27 | 3 |
| 7-11 | 8 | 50 | 10 | 3 | 1 | 25 | 1.5 | 1.5 |
| 7-12 | 25 | 25 | 10 | 6 | 6 | 25 | 1.5 | 1.5 |
| 7-13 | 8 | 50 | 1 | 10 | 3 | 25 | 1.6 | 1.4 |
| 7-14 | 21 | 25 | 6 | 10 | 10 | 25 | 2 | 1 |
| 7-15 | 10 | 50 | 5 | 1 | 1 | 30 | 2 | 1 |
| 7-16 | 10 | 25 | 10 | 1 | 1 | 50 | 2.4 | 0.6 |
| 7-17 | 20 | 25 | 6 | 1 | 1 | 28 | 4 | 15 |
| 7-18 | 10 | 25 | 1 | 10 | 1 | 28 | 5 | 20 |
| 7-19 | 20 | 25 | 10 | 10 | 2 | 30 | 1 | 2 |
| 7-20 | 20 | 25 | 10 | 5.4 | 5.6 | 30 | 2.7 | 0.3 |
| 7-21 | 20 | 25 | 8 | 10 | 6 | 28 | 1.6 | 1.4 |
| 7-22 | 20 | 25 | 6 | 8 | 10 | 28 | 2 | 1 |

TABLE 8

| Example | Component Content (%) | | | | | | |
|---|---|---|---|---|---|---|---|
| | B₂O₃ | ZnO | SiO₂ | ZrO₂ | La₂O₃ | TiO₂ | Nb₂O₅ |
| 8-1 | 6 | 24.8 | 0.3 | 14.9 | 24 | 10 | 20 |
| 8-2 | 7.9 | 50 | 0.2 | 15 | 24.9 | 1 | 1 |
| 8-3 | 30 | 20 | 15 | 14 | 20 | 0 | 1 |
| 8-4 | 7.5 | 50 | 15 | 0.1 | 24.9 | 2 | 0.5 |
| 8-5 | 5 | 24.9 | 11 | 13.1 | 20 | 23.4 | 2.6 |
| 8-6 | 7.9 | 17.9 | 14.3 | 0.9 | 50 | 7 | 2 |
| 8-7 | 26.8 | 50 | 0.6 | 0.6 | 21 | 0 | 1 |
| 8-8 | 26.8 | 21 | 0.6 | 0.6 | 50 | 0 | 1 |
| 8-9 | 8 | 35 | 3 | 1 | 50 | 2 | 1 |
| 8-10 | 8 | 31 | 1 | 5 | 25 | 27 | 3 |
| 8-11 | 9 | 50 | 10 | 1 | 27 | 1.5 | 1.5 |
| 8-12 | 25 | 35 | 6 | 6 | 25 | 1.5 | 1.5 |
| 8-13 | 8 | 50 | 10 | 3 | 26 | 1.6 | 1.4 |
| 8-14 | 25 | 25 | 10 | 10 | 27 | 2 | 1 |
| 8-15 | 15 | 50 | 1 | 1 | 30 | 2 | 1 |
| 8-16 | 10 | 35 | 1 | 1 | 50 | 2.4 | 0.6 |
| 8-17 | 20 | 31 | 1 | 1 | 28 | 4 | 15 |
| 8-18 | 10 | 25 | 10 | 1 | 29 | 5 | 20 |
| 8-19 | 20 | 35 | 10 | 2 | 30 | 1 | 2 |
| 8-20 | 20 | 25 | 5.4 | 5.6 | 41 | 2.7 | 0.3 |
| 8-21 | 20 | 33 | 10 | 6 | 28 | 1.6 | 1.4 |
| 8-22 | 20 | 25 | 8 | 10 | 34 | 2 | 1 |

TABLE 9

| Example | Component Content (%) | | | | | | | |
|---|---|---|---|---|---|---|---|---|
| | B$_2$O$_3$ | ZnO | SiO$_2$ | ZrO$_2$ | La$_2$O$_3$ | TiO$_2$ | Nb$_2$O$_5$ | BaO |
| 9-1 | 5 | 20 | 0.1 | 14.9 | 20 | 10 | 20 | 10 |
| 9-2 | 5 | 50 | 0.1 | 15 | 20 | 1 | 1 | 7.9 |
| 9-3 | 30 | 20 | 15 | 12 | 21 | 0 | 1 | 1 |
| 9-4 | 5 | 50 | 12.4 | 0.1 | 20 | 2 | 0.5 | 10 |
| 9-5 | 5 | 20 | 11 | 10.5 | 20 | 23.4 | 2.6 | 7.5 |
| 9-6 | 7.9 | 20.6 | 11.5 | 0.9 | 50 | 7 | 2 | 0.1 |
| 9-7 | 26.8 | 50 | 0.6 | 0.6 | 20 | 0 | 1 | 1 |
| 9-8 | 26.8 | 20 | 0.6 | 0.6 | 50 | 0 | 1 | 1 |
| 9-9 | 8 | 25 | 3 | 1 | 50 | 2 | 1 | 10 |
| 9-10 | 8 | 25 | 1 | 5 | 25 | 27 | 3 | 6 |
| 9-11 | 8 | 50 | 3 | 1 | 25 | 1.5 | 1.5 | 10 |
| 9-12 | 25 | 25 | 6 | 6 | 25 | 1.5 | 1.5 | 10 |
| 9-13 | 8 | 50 | 10 | 3 | 25 | 1.6 | 1.4 | 1 |
| 9-14 | 21 | 25 | 10 | 10 | 25 | 2 | 1 | 6 |
| 9-15 | 10 | 50 | 1 | 1 | 30 | 2 | 1 | 5 |
| 9-16 | 10 | 25 | 1 | 1 | 50 | 2.4 | 0.6 | 10 |
| 9-17 | 20 | 25 | 1 | 1 | 28 | 4 | 15 | 6 |
| 9-18 | 10 | 25 | 10 | 1 | 28 | 5 | 20 | 1 |
| 9-19 | 20 | 25 | 10 | 2 | 30 | 1 | 2 | 10 |
| 9-20 | 20 | 25 | 5.4 | 5.6 | 30 | 2.7 | 0.3 | 10 |
| 9-21 | 20 | 25 | 10 | 6 | 28 | 1.6 | 1.4 | 8 |
| 9-22 | 20 | 25 | 8 | 10 | 28 | 2 | 1 | 6 |

TABLE 10

| Example | Component Content (%) | | | | | | | |
|---|---|---|---|---|---|---|---|---|
| | B$_2$O$_3$ | ZnO | SiO$_2$ | ZrO$_2$ | La$_2$O$_3$ | TiO$_2$ | Nb$_2$O$_5$ | Al$_2$O$_3$ |
| 10-1 | 5 | 20 | 0.1 | 14.9 | 20 | 10 | 20 | 10 |
| 10-2 | 5 | 50 | 0.1 | 15 | 20 | 1 | 1 | 7.9 |
| 10-3 | 30 | 20 | 15 | 12 | 21 | 0 | 1 | 1 |
| 10-4 | 5 | 50 | 12.4 | 0.1 | 20 | 2 | 0.5 | 10 |
| 10-5 | 5 | 20 | 11 | 10.5 | 20 | 23.4 | 2.6 | 7.5 |
| 10-6 | 7.9 | 20.6 | 11.5 | 0.9 | 50 | 7 | 2 | 0.1 |
| 10-7 | 26.8 | 50 | 0.6 | 0.6 | 20 | 0 | 1 | 1 |
| 10-8 | 26.8 | 20 | 0.6 | 0.6 | 50 | 0 | 1 | 1 |
| 10-9 | 8 | 25 | 3 | 1 | 50 | 2 | 1 | 10 |
| 10-10 | 8 | 25 | 1 | 5 | 25 | 27 | 3 | 6 |
| 10-11 | 8 | 50 | 3 | 1 | 25 | 1.5 | 1.5 | 10 |
| 10-12 | 25 | 25 | 6 | 6 | 25 | 1.5 | 1.5 | 10 |
| 10-13 | 8 | 50 | 10 | 3 | 25 | 1.6 | 1.4 | 1 |
| 10-14 | 21 | 25 | 10 | 10 | 25 | 2 | 1 | 6 |
| 10-15 | 10 | 50 | 1 | 1 | 30 | 2 | 1 | 5 |
| 10-16 | 10 | 25 | 1 | 1 | 50 | 2.4 | 0.6 | 10 |
| 10-17 | 20 | 25 | 1 | 1 | 28 | 4 | 15 | 6 |
| 10-18 | 10 | 25 | 10 | 1 | 28 | 5 | 20 | 1 |
| 10-19 | 20 | 25 | 10 | 2 | 30 | 1 | 2 | 10 |
| 10-20 | 20 | 25 | 5.4 | 5.6 | 30 | 2.7 | 0.3 | 10 |
| 10-21 | 20 | 25 | 10 | 6 | 28 | 1.6 | 1.4 | 8 |
| 10-22 | 20 | 25 | 8 | 10 | 28 | 2 | 1 | 6 |

TABLE 11

| Example | Nd | vd | Tg/° C. | Upper Crystallization Temperature | λ80 | λ5 | λ80/λ5 |
|---|---|---|---|---|---|---|---|
| 1-1 | 1.8012 | 30.56 | 568 | 1149 | 394 | 338 | 1.17 |
| 1-2 | 1.8015 | 30.48 | 625 | 1000 | 392 | 330 | 1.19 |
| 1-3 | 1.8012 | 30.23 | 630 | 1150 | 419 | 342 | 1.23 |
| 1-4 | 1.8021 | 30.35 | 590 | 957 | 396 | 337 | 1.18 |
| 1-5 | 1.8022 | 30.36 | 521 | 950 | 387 | 332 | 1.17 |
| 1-6 | 1.8092 | 30.28 | 575 | 964 | 382 | 339 | 1.13 |
| 1-7 | 1.8095 | 30.34 | 573 | 991 | 408 | 346 | 1.18 |
| 1-8 | 1.8086 | 30.29 | 561 | 989 | 402 | 342 | 1.18 |
| 1-9 | 1.8169 | 31.38 | 580 | 998 | 387 | 338 | 1.14 |
| 1-10 | 1.8167 | 31.25 | 576 | 1150 | 395 | 337 | 1.17 |
| 1-11 | 1.7158 | 31.42 | 565 | 976 | 380 | 331 | 1.15 |
| 1-12 | 1.8149 | 31.36 | 531 | 950 | 386 | 329 | 1.17 |
| 1-13 | 1.8169 | 31.37 | 579 | 964 | 395 | 327 | 1.21 |
| 1-14 | 1.8189 | 31.96 | 618 | 968 | 384 | 326 | 1.18 |
| 1-15 | 1.8195 | 31.89 | 521 | 957 | 386 | 321 | 1.20 |
| 1-16 | 1.8179 | 31.69 | 580 | 950 | 391 | 320 | 1.22 |
| 1-17 | 1.8159 | 31.89 | 604 | 984 | 397 | 329 | 1.21 |
| 1-18 | 1.8169 | 31.78 | 598 | 982 | 395 | 335 | 1.18 |
| 1-19 | 1.8192 | 31.29 | 569 | 976 | 385 | 339 | 1.14 |
| 1-20 | 1.8158 | 31.38 | 575 | 950 | 387 | 337 | 1.15 |
| 1-21 | 1.8169 | 31.37 | 578 | 964 | 396 | 341 | 1.16 |
| 1-22 | 1.8169 | 31.94 | 593 | 968 | 382 | 343 | 1.11 |
| 2-1 | 1.8025 | 30.23 | 580 | 1136 | 395 | 329 | 395 |
| 2-2 | 1.8013 | 30.34 | 595 | 1150 | 380 | 320 | 380 |
| 2-3 | 1.8015 | 30.25 | 601 | 1148 | 408 | 349 | 1.17 |
| 2-4 | 1.8033 | 30.36 | 595 | 975 | 372 | 319 | 1.17 |
| 2-5 | 1.8026 | 30.25 | 574 | 991 | 378 | 315 | 1.20 |
| 2-6 | 1.8087 | 30.27 | 561 | 989 | 379 | 316 | 1.20 |
| 2-7 | 1.8092 | 30.28 | 548 | 965 | 409 | 341 | 1.20 |
| 2-8 | 1.8095 | 30.34 | 556 | 968 | 402 | 336 | 1.20 |
| 2-9 | 1.8136 | 31.39 | 558 | 982 | 371 | 319 | 1.16 |
| 2-10 | 1.8124 | 31.37 | 567 | 1146 | 378 | 315 | 1.20 |
| 2-11 | 1.8169 | 31.68 | 579 | 975 | 376 | 312 | 1.21 |
| 2-12 | 1.8197 | 31.69 | 549 | 957 | 361 | 318 | 1.14 |
| 2-13 | 1.8187 | 31.26 | 547 | 948 | 368 | 317 | 1.16 |
| 2-14 | 1.8188 | 31.69 | 586 | 969 | 369 | 319 | 1.16 |
| 2-15 | 1.8195 | 31.89 | 563 | 957 | 364 | 320 | 1.14 |
| 2-16 | 1.8196 | 31.96 | 575 | 967 | 362 | 310 | 1.17 |
| 2-17 | 1.8195 | 31.36 | 620 | 965 | 351 | 311 | 1.13 |
| 2-18 | 1.8184 | 31.34 | 615 | 968 | 352 | 317 | 1.11 |
| 2-19 | 1.8192 | 31.29 | 542 | 975 | 359 | 308 | 1.17 |
| 2-20 | 1.8158 | 31.38 | 568 | 957 | 350 | 309 | 1.13 |
| 2-21 | 1.8169 | 31.37 | 548 | 948 | 356 | 305 | 1.17 |
| 2-22 | 1.8169 | 31.94 | 609 | 969 | 367 | 304 | 1.21 |
| 3-1 | 1.8063 | 30.36 | 562 | 1096 | 356 | 309 | 1.15 |
| 3-2 | 1.8056 | 30.25 | 603 | 1011 | 354 | 315 | 1.12 |
| 3-3 | 1.8061 | 30.39 | 608 | 1087 | 417 | 342 | 1.22 |
| 3-4 | 1.8068 | 30.24 | 598 | 952 | 359 | 313 | 1.15 |
| 3-5 | 1.8058 | 30.26 | 568 | 951 | 376 | 316 | 1.19 |
| 3-6 | 1.8078 | 30.25 | 551 | 953 | 368 | 312 | 1.18 |
| 3-7 | 1.8067 | 30.30 | 554 | 967 | 413 | 335 | 1.23 |
| 3-8 | 1.8069 | 30.32 | 568 | 959 | 414 | 338 | 1.22 |
| 3-9 | 1.8149 | 31.36 | 567 | 1000 | 358 | 317 | 1.13 |
| 3-10 | 1.8169 | 31.37 | 575 | 1005 | 362 | 306 | 1.18 |
| 3-11 | 1.8189 | 31.96 | 578 | 991 | 367 | 308 | 1.19 |
| 3-12 | 1.8179 | 31.97 | 528 | 987 | 364 | 304 | 1.20 |
| 3-13 | 1.8195 | 31.89 | 526 | 983 | 362 | 306 | 1.18 |
| 3-14 | 1.8179 | 31.69 | 615 | 987 | 371 | 304 | 1.22 |
| 3-15 | 1.8159 | 31.89 | 530 | 992 | 376 | 306 | 1.23 |
| 3-16 | 1.8169 | 31.78 | 554 | 998 | 375 | 305 | 1.23 |
| 3-17 | 1.8169 | 31.36 | 609 | 967 | 374 | 304 | 1.23 |
| 3-18 | 1.8159 | 31.34 | 607 | 959 | 372 | 318 | 1.17 |
| 3-19 | 1.8145 | 31.25 | 521 | 991 | 367 | 317 | 1.16 |
| 3-20 | 1.8168 | 31.78 | 541 | 987 | 365 | 314 | 1.16 |
| 3-21 | 1.8157 | 31.34 | 532 | 983 | 369 | 313 | 1.18 |
| 3-22 | 1.8169 | 31.69 | 623 | 987 | 378 | 318 | 1.19 |
| 4-1 | 1.8215 | 32.23 | 575 | 1028 | 391 | 341 | 1.15 |
| 4-2 | 1.8218 | 32.34 | 593 | 1123 | 392 | 345 | 1.14 |
| 4-3 | 1.8223 | 32.25 | 602 | 1069 | 407 | 334 | 1.22 |
| 4-4 | 1.8221 | 32.36 | 592 | 962 | 381 | 337 | 1.13 |
| 4-5 | 1.8231 | 32.45 | 513 | 968 | 385 | 331 | 1.16 |
| 4-6 | 1.8227 | 32.24 | 525 | 967 | 394 | 339 | 1.16 |
| 4-7 | 1.8221 | 32.36 | 520 | 959 | 409 | 341 | 1.20 |
| 4-8 | 1.8226 | 32.45 | 568 | 957 | 402 | 336 | 1.20 |
| 4-9 | 1.8305 | 33.15 | 557 | 954 | 394 | 338 | 1.17 |
| 4-10 | 1.8312 | 33.14 | 569 | 1039 | 387 | 338 | 1.14 |
| 4-11 | 1.8309 | 33.26 | 578 | 967 | 396 | 337 | 1.18 |
| 4-12 | 1.8315 | 33.25 | 514 | 954 | 387 | 332 | 1.17 |
| 4-13 | 1.8314 | 33.24 | 528 | 950 | 382 | 339 | 1.13 |
| 4-14 | 1.8369 | 33.89 | 630 | 961 | 387 | 338 | 1.14 |
| 4-15 | 1.8374 | 33.78 | 545 | 968 | 391 | 336 | 1.16 |
| 4-16 | 1.8391 | 33.96 | 550 | 972 | 395 | 337 | 1.17 |
| 4-17 | 1.8379 | 33.58 | 628 | 959 | 407 | 347 | 1.17 |
| 4-18 | 1.8394 | 33.87 | 598 | 957 | 409 | 349 | 1.17 |
| 4-19 | 1.8369 | 33.94 | 561 | 967 | 403 | 350 | 1.15 |
| 4-20 | 1.8369 | 33.87 | 574 | 954 | 408 | 350 | 1.17 |
| 4-21 | 1.8379 | 33.98 | 529 | 950 | 418 | 348 | 1.20 |

TABLE 11-continued

| Example | Nd | vd | Tg/° C. | Upper Crystallization Temperature | λ80 | λ5 | λ80/λ5 |
|---|---|---|---|---|---|---|---|
| 4-22 | 1.8359 | 33.78 | 605 | 961 | 419 | 341 | 1.23 |
| 5-1 | 1.8227 | 32.24 | 574 | 1068 | 380 | 331 | 1.15 |
| 5-2 | 1.8221 | 32.36 | 603 | 1013 | 386 | 329 | 1.17 |
| 5-3 | 1.8226 | 32.45 | 615 | 1067 | 420 | 350 | 1.20 |
| 5-4 | 1.8230 | 32.28 | 590 | 968 | 384 | 326 | 1.18 |
| 5-5 | 1.8223 | 32.45 | 563 | 969 | 386 | 321 | 1.20 |
| 5-6 | 1.8218 | 32.34 | 528 | 979 | 391 | 320 | 1.22 |
| 5-7 | 1.8223 | 32.25 | 527 | 979 | 417 | 341 | 1.22 |
| 5-8 | 1.8221 | 32.36 | 546 | 987 | 419 | 342 | 1.23 |
| 5-9 | 1.8303 | 33.56 | 557 | 971 | 391 | 341 | 1.15 |
| 5-10 | 1.8312 | 33.64 | 578 | 1126 | 395 | 329 | 1.20 |
| 5-11 | 1.8320 | 33.34 | 568 | 968 | 385 | 339 | 1.14 |
| 5-12 | 1.8315 | 33.56 | 545 | 962 | 387 | 337 | 1.15 |
| 5-13 | 1.8319 | 33.28 | 562 | 963 | 396 | 341 | 1.16 |
| 5-14 | 1.8369 | 33.87 | 603 | 981 | 382 | 343 | 1.11 |
| 5-15 | 1.8379 | 33.98 | 568 | 957 | 381 | 328 | 1.16 |
| 5-16 | 1.8359 | 33.78 | 549 | 953 | 395 | 329 | 1.20 |
| 5-17 | 1.8378 | 33.58 | 609 | 979 | 392 | 345 | 1.14 |
| 5-18 | 1.8388 | 33.68 | 623 | 987 | 395 | 338 | 1.17 |
| 5-19 | 1.8387 | 33.98 | 547 | 968 | 381 | 337 | 1.13 |
| 5-20 | 1.8351 | 33.56 | 561 | 962 | 385 | 331 | 1.16 |
| 5-21 | 1.8353 | 33.45 | 536 | 963 | 394 | 339 | 1.16 |
| 5-22 | 1.8360 | 33.61 | 598 | 981 | 387 | 335 | 1.16 |
| 6-1 | 1.8423 | 34.23 | 530 | 1139 | 380 | 320 | 1.19 |
| 6-2 | 1.8431 | 34.36 | 627 | 1136 | 372 | 319 | 1.17 |
| 6-3 | 1.8436 | 34.36 | 621 | 1145 | 408 | 332 | 1.23 |
| 6-4 | 1.8401 | 34.25 | 598 | 969 | 379 | 316 | 1.20 |
| 6-5 | 1.8421 | 34.34 | 515 | 967 | 371 | 319 | 1.16 |
| 6-6 | 1.8421 | 34.16 | 513 | 964 | 376 | 312 | 1.21 |
| 6-7 | 1.8432 | 34.18 | 520 | 981 | 406 | 341 | 1.19 |
| 6-8 | 1.8415 | 34.36 | 578 | 973 | 402 | 348 | 1.16 |
| 6-9 | 1.8511 | 35.34 | 567 | 978 | 369 | 319 | 1.16 |
| 6-10 | 1.8513 | 35.36 | 541 | 1145 | 356 | 305 | 1.17 |
| 6-11 | 1.8515 | 35.26 | 568 | 968 | 362 | 310 | 1.17 |
| 6-12 | 1.8523 | 35.46 | 521 | 962 | 351 | 311 | 1.13 |
| 6-13 | 1.8530 | 35.25 | 534 | 972 | 352 | 317 | 1.11 |
| 6-14 | 1.8595 | 35.87 | 603 | 981 | 359 | 308 | 1.17 |
| 6-15 | 1.8569 | 35.98 | 521 | 967 | 350 | 309 | 1.13 |
| 6-16 | 1.8579 | 35.86 | 519 | 982 | 356 | 305 | 1.17 |
| 6-17 | 1.8586 | 35.68 | 600 | 981 | 391 | 341 | 1.15 |
| 6-18 | 1.8579 | 35.69 | 599 | 973 | 392 | 345 | 1.14 |
| 6-19 | 1.8569 | 35.68 | 519 | 968 | 395 | 338 | 1.17 |
| 6-20 | 1.8597 | 35.89 | 557 | 962 | 381 | 337 | 1.13 |
| 6-21 | 1.8596 | 35.69 | 537 | 972 | 385 | 331 | 1.16 |
| 6-22 | 1.8576 | 35.87 | 598 | 981 | 394 | 339 | 1.16 |
| 7-1 | 1.8815 | 38.15 | 501 | 1097 | 367 | 304 | 1.21 |
| 7-2 | 1.8813 | 38.36 | 603 | 1086 | 371 | 306 | 1.21 |
| 7-3 | 1.8832 | 38.25 | 604 | 1081 | 417 | 341 | 1.22 |
| 7-4 | 1.8818 | 38.45 | 598 | 993 | 354 | 315 | 1.12 |
| 7-5 | 1.8834 | 38.38 | 509 | 1000 | 359 | 313 | 1.15 |
| 7-6 | 1.8817 | 38.25 | 508 | 968 | 376 | 316 | 1.19 |
| 7-7 | 1.8819 | 38.18 | 515 | 956 | 418 | 350 | 1.19 |
| 7-8 | 1.8813 | 38.49 | 559 | 992 | 405 | 347 | 1.17 |
| 7-9 | 1.8915 | 39.25 | 567 | 969 | 367 | 308 | 1.19 |
| 7-10 | 1.8917 | 39.34 | 541 | 1068 | 372 | 318 | 1.17 |
| 7-11 | 1.8921 | 39.26 | 513 | 998 | 362 | 306 | 1.18 |
| 7-12 | 1.8931 | 39.36 | 579 | 991 | 371 | 304 | 1.22 |
| 7-13 | 1.8935 | 39.34 | 571 | 978 | 376 | 306 | 1.23 |
| 7-14 | 1.8969 | 39.89 | 605 | 968 | 375 | 305 | 1.23 |
| 7-15 | 1.8987 | 39.78 | 509 | 959 | 374 | 304 | 1.23 |
| 7-16 | 1.8989 | 39.98 | 568 | 967 | 372 | 318 | 1.17 |
| 7-17 | 1.8979 | 39.89 | 613 | 992 | 395 | 338 | 1.17 |
| 7-18 | 1.8997 | 39.78 | 602 | 998 | 381 | 337 | 1.13 |
| 7-19 | 1.8969 | 39.89 | 576 | 991 | 385 | 331 | 1.16 |
| 7-20 | 1.8997 | 39.54 | 568 | 978 | 394 | 339 | 1.16 |
| 7-21 | 1.8991 | 39.78 | 561 | 968 | 387 | 335 | 1.16 |
| 7-22 | 1.8997 | 39.96 | 609 | 959 | 386 | 336 | 1.15 |
| 8-1 | 1.8817 | 38.25 | 541 | 1034 | 367 | 317 | 1.16 |
| 8-2 | 1.8819 | 38.18 | 590 | 961 | 365 | 314 | 1.16 |
| 8-3 | 1.8813 | 38.49 | 595 | 1056 | 408 | 336 | 1.21 |
| 8-4 | 1.8821 | 38.39 | 599 | 989 | 378 | 318 | 1.19 |
| 8-5 | 1.8825 | 38.48 | 528 | 967 | 380 | 305 | 1.25 |
| 8-6 | 1.8832 | 38.25 | 521 | 959 | 361 | 306 | 1.18 |
| 8-7 | 1.8818 | 38.45 | 513 | 968 | 413 | 347 | 1.19 |
| 8-8 | 1.8834 | 38.38 | 546 | 957 | 407 | 349 | 1.17 |
| 8-9 | 1.8934 | 39.36 | 554 | 959 | 362 | 310 | 1.17 |
| 8-10 | 1.8935 | 39.35 | 559 | 1064 | 350 | 309 | 1.13 |
| 8-11 | 1.8923 | 39.45 | 529 | 969 | 367 | 315 | 1.17 |
| 8-12 | 1.8961 | 39.58 | 519 | 965 | 378 | 301 | 1.26 |
| 8-13 | 1.8997 | 39.54 | 528 | 962 | 374 | 300 | 1.25 |
| 8-14 | 1.8991 | 39.78 | 615 | 959 | 375 | 306 | 1.23 |
| 8-15 | 1.8997 | 39.96 | 503 | 957 | 361 | 308 | 1.17 |
| 8-16 | 1.8996 | 39.89 | 519 | 958 | 350 | 309 | 1.13 |
| 8-17 | 1.8995 | 39.78 | 609 | 968 | 367 | 317 | 1.16 |
| 8-18 | 1.8994 | 39.89 | 605 | 957 | 365 | 314 | 1.16 |
| 8-19 | 1.8996 | 39.78 | 507 | 969 | 369 | 313 | 1.18 |
| 8-20 | 1.8979 | 39.89 | 509 | 965 | 378 | 318 | 1.19 |
| 8-21 | 1.8997 | 39.78 | 500 | 962 | 380 | 305 | 1.25 |
| 8-22 | 1.8969 | 39.89 | 607 | 959 | 361 | 306 | 1.18 |
| 9-1 | 1.8728 | 37.38 | 518 | 1127 | 391 | 341 | 1.15 |
| 9-2 | 1.8729 | 37.18 | 615 | 1150 | 392 | 345 | 1.14 |
| 9-3 | 1.8731 | 37.29 | 619 | 1138 | 402 | 325 | 1.24 |
| 9-4 | 1.8726 | 37.48 | 592 | 954 | 368 | 319 | 1.15 |
| 9-5 | 1.8736 | 37.38 | 568 | 962 | 362 | 317 | 1.14 |
| 9-6 | 1.8798 | 37.89 | 549 | 967 | 381 | 329 | 1.16 |
| 9-7 | 1.8789 | 37.96 | 508 | 963 | 406 | 341 | 1.19 |
| 9-8 | 1.8769 | 37.86 | 523 | 967 | 402 | 348 | 1.16 |
| 9-9 | 1.8797 | 37.87 | 561 | 987 | 361 | 307 | 1.18 |
| 9-10 | 1.8759 | 37.69 | 554 | 1139 | 368 | 304 | 1.21 |
| 9-11 | 1.8798 | 37.89 | 521 | 961 | 385 | 321 | 1.20 |
| 9-12 | 1.8815 | 38.15 | 526 | 987 | 386 | 334 | 1.16 |
| 9-13 | 1.8813 | 38.36 | 529 | 983 | 356 | 306 | 1.16 |
| 9-14 | 1.8832 | 38.25 | 623 | 987 | 387 | 331 | 1.17 |
| 9-15 | 1.8818 | 38.45 | 527 | 968 | 361 | 308 | 1.17 |
| 9-16 | 1.8834 | 38.38 | 537 | 959 | 368 | 304 | 1.21 |
| 9-17 | 1.8817 | 38.25 | 630 | 963 | 392 | 345 | 1.14 |
| 9-18 | 1.8819 | 38.18 | 615 | 967 | 395 | 338 | 1.17 |
| 9-19 | 1.8813 | 38.49 | 527 | 961 | 381 | 337 | 1.13 |
| 9-20 | 1.8821 | 38.39 | 578 | 987 | 385 | 331 | 1.16 |
| 9-21 | 1.8825 | 38.48 | 523 | 983 | 394 | 339 | 1.16 |
| 9-22 | 1.8818 | 38.45 | 621 | 987 | 387 | 335 | 1.16 |
| 10-1 | 1.8726 | 37.48 | 550 | 1118 | 389 | 341 | 1.14 |
| 10-2 | 1.8736 | 37.38 | 592 | 1129 | 381 | 342 | 1.11 |
| 10-3 | 1.8798 | 37.89 | 595 | 1127 | 415 | 332 | 1.25 |
| 10-4 | 1.8789 | 37.96 | 598 | 950 | 351 | 306 | 1.15 |
| 10-5 | 1.8769 | 37.86 | 503 | 1000 | 352 | 307 | 1.15 |
| 10-6 | 1.8797 | 37.87 | 501 | 969 | 391 | 341 | 1.15 |
| 10-7 | 1.8759 | 37.69 | 508 | 967 | 407 | 347 | 1.17 |
| 10-8 | 1.8798 | 37.89 | 569 | 958 | 409 | 349 | 1.17 |
| 10-9 | 1.8815 | 38.15 | 558 | 987 | 359 | 317 | 1.13 |
| 10-10 | 1.8813 | 38.36 | 554 | 1052 | 354 | 315 | 1.12 |
| 10-11 | 1.8832 | 38.25 | 511 | 969 | 398 | 347 | 1.15 |
| 10-12 | 1.8818 | 38.45 | 521 | 951 | 390 | 346 | 1.13 |
| 10-13 | 1.8834 | 38.38 | 528 | 952 | 367 | 315 | 1.17 |
| 10-14 | 1.8915 | 39.25 | 605 | 969 | 395 | 345 | 1.14 |
| 10-15 | 1.8917 | 39.34 | 507 | 989 | 369 | 319 | 1.16 |
| 10-16 | 1.8921 | 39.26 | 537 | 971 | 371 | 320 | 1.16 |
| 10-17 | 1.8931 | 39.36 | 612 | 967 | 371 | 306 | 1.21 |
| 10-18 | 1.8935 | 39.34 | 613 | 958 | 356 | 309 | 1.15 |
| 10-19 | 1.8969 | 39.89 | 532 | 969 | 354 | 315 | 1.12 |
| 10-20 | 1.8987 | 39.78 | 580 | 951 | 359 | 313 | 1.15 |
| 10-21 | 1.8989 | 39.98 | 542 | 952 | 376 | 316 | 1.19 |
| 10-22 | 1.8979 | 39.89 | 627 | 969 | 368 | 312 | 1.18 |

The examples above are only preferable embodiments of the present invention and it should be noted that, the preferable embodiments described above should not be regarded as limitation on the present invention and the scope of the present invention should be defined by the attached claims. It will be apparent to those skilled in the art that various changes and modifications may be made without departing from the spirit and the scope of the present invention, and those changes and modifications also fall within the protection scope of the present invention.

What is claimed is:

1. An optical glass comprising:
   $B_2O_3$: 5% to 30%;
   ZnO: 25% to 50%;
   $SiO_2$: more than 0% but less than or equal to 15%;
   $ZrO_2$: more than 0% but less than or equal to 15%;
   $Ln_2O_3$: 20% to 50%;
   R1: 1% to 30%; and
   R2: 0.1% to 10%, wherein the contents are presented by weight percentage,
   wherein, $Ln_2O_3$ is at least one selected from a group consisting of $La_2O_3$, $Gd_2O_3$, $Y_2O_3$ and $Yb_2O_3$;
   R1 is $TiO_2$ and $Nb_2O_5$, and the weight percentage ratio of $TiO_2$ to $TiO_2+Nb_2O_5$, as represented by the equation ($TiO_2/(TiO_2+Nb_2O_5)$), is 0.2 to 0.67; and
   R2 is at least one selected from a group consisting of $Li_2O$, $Na_2O$ and $K_2O$.

2. The optical glass according to claim 1, wherein the contents of $B_2O_3$ is, by weight percentage, 8% to 25%.

3. The optical glass according to claim 1, wherein the contents of $SiO_2$ is, by weight percentage, 1% to 10%.

4. The optical glass according to claim 1, wherein the content of $ZrO_2$ is, by weight percentage, 1% to 10%.

5. The optical glass according to claim 1, wherein the content of $Ln_2O_3$ is, by weight percentage, 25% to 50%.

6. The optical glass according to claim 1, wherein the content of R1 is, by weight percentage, 3% to 30%.

7. The optical glass according to claim 1, wherein the sum of $SiO_2$ and $B_2O_3$, i.e., $SiO_2+B_2O_3$, presented by weight percentage, is 10% to 35%.

8. The optical glass according to claim 1, wherein the weight percentage ratio of R1 to $ZrO_2$, i.e., $R1/ZrO_2$, is 0.5 to 10.

9. The optical glass according to claim 1, wherein the optical glass has a refractive index nd of 1.80 to 1.90, an Abbe number vd of 30 to 40, and a transition temperature Tg of 630° C. or less.

10. The optical glass according to claim 1, wherein the upper crystallization temperature of the optical glass is 1150° C. or less.

11. A glass preform made of the optical glass according to claim 1.

12. An optical element made of the optical glass according to claim 1.

13. An optical instrument formed of the optical glass according to claim 1.

* * * * *